United States Patent [19]
Martucci

[11] 3,878,040
[45] Apr. 15, 1975

[54] FAILED FUEL DETECTOR

[75] Inventor: John Anthony Martucci, Charleroi, Pa.

[73] Assignee: Combustion Engineering, Inc., Windsor, Conn.

[22] Filed: Sept. 20, 1973

[21] Appl. No.: 399,038

[52] U.S. Cl. ............................................. 176/19 LD
[51] Int. Cl. ............................................. G21c 17/04
[58] Field of Search....................... 176/19 LD, 19 R

[56] References Cited
UNITED STATES PATENTS
3,234,101  2/1966  Berthod.......................... 176/19 LD

OTHER PUBLICATIONS

Nucleonics, Vol. 19, No. 7, July 1961, pp. 84, 86, 89, by Osborne.

*Primary Examiner*—Harvey E. Behrend
*Attorney, Agent, or Firm*—Stephen L. Borst

[57] ABSTRACT

A failed fuel detection apparatus for a nuclear reactor having a liquid cooled core comprising a gas collection hood adapted to engage the top of the suspect assembly and means for delivering a stripping gas to the vicinity of the bottom of the suspect fuel assembly.

4 Claims, 3 Drawing Figures

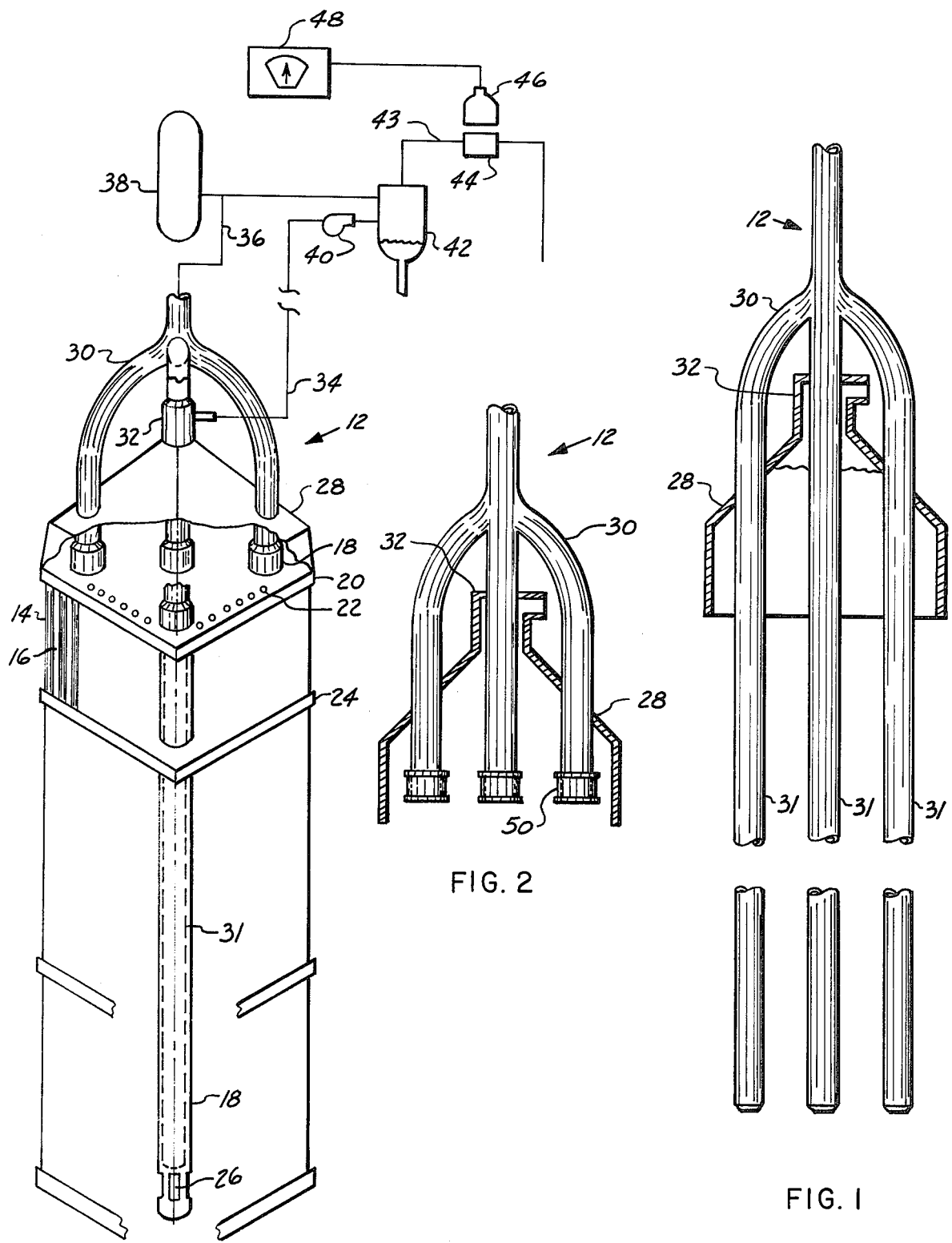

FAILED FUEL DETECTOR

BACKGROUND OF THE INVENTION

1. Field of the Invention

This invention relates to the field of failed fuel element detection in a liquid cooled nuclear reactor.

In state-of-the-art water cooled nuclear reactors, heat is generated by the fission process in the fuel material which may consist of fissionable uranium or plutonium. The fission process, however, produces not only heat but also radioactive isotopes which are potentially harmful and must be prevented from escaping to the environment. To this end the fuel is clad with a material which retains the fission products.

In water cooled reactors the heat that is generated by the fission process in the fuel material is transferred to the water coolant which circulates around the fuel elements. If the cladding on one or more of the fuel elements fails, then the fission products are no longer prevented from escaping into the coolant and coolant contamination results. This is an undesirable event since the radioactivity is then able to escape to the reactor containment atmosphere either through coolant leaks or through the surface of the refueling pool when the reactor is opened for refueling. It is therefore necessary to develop equipment and methods which enable the detection of the particular fuel assembly which contains the failed fuel element so that the failed fuel assembly or pin in the case of demountable assemblies, may be replaced with a new fuel.

2. Description of the Prior Art

Methods and equipment have been developed which enable the detection of the presence of failed fuel. See U.S. Pat. Nos. 2,998,519; 3,073,767; and 3,234,101 which patents are illustrative of some of the prior art techniques. The techniques therein described, however, do not permit the easy location of the exact failed fuel assembly in one of the modern water cooled power reactors.

The method presently being employed in the nuclear power reactor art is that method commonly called "dry sipping". In the dry sipping method, the reactor coolant is continually monitored for an indication that a fuel element has failed. Upon a failure the coolant increases in radioactivity. This increase in radioactivity is detected and an alarm sounded to alert the reactor operator of the presence of failed fuel. If immediate repair is deemed necessary, the reactor is shut down, the reactor pressure vessel head removed, and the vessel internals located above the reactor core withdrawn. Next, each suspected fuel assembly is removed from the core and placed in a closed container. Pressurized gas is introduced into the container to forcibly expell the water from the container to expose the fuel rods. The fuel rods no longer have the benefit of the cooling provided by water and the fuel rods begin to heat up due to their residual radioactivity. The increased heat heats the gaseous fission products which have been formed within the cladding and tends to drive the gaseous fission products out through any defect in the cladding. The gas pressure in the closed container is then reduced, allowing the water to re-enter the container, and causing the gas to be expelled therefrom. The expelled gas is then sampled for the presence of fission products.

The above-described prior art method is both costly and time consuming in that each tested assembly must be separately withdrawn from the core. This procedure not only disturbs the core unnecessarily but also requires the tedious task of placing each individual assembly into a closed container, one at a time. This process is lengthy and requires the use of the refueling machine. Concurrent refueling of the reactor is not possible since the refueling machine is employed in the dry sipping process. The cask of the refueling machine becomes contaminated and reduces the ability to detect subseqeunt failed elements unless time consuming decontamination is performed. The net result is that the "down time" of the reactor during refueling is extended with resultant loss of overall reactor operating availability. It is, therefore, seen that a simple method and apparatus which can test each assembly for failed fuel elements while the assembly remains in the core are desirable. Such a method and apparatus would be equally applicable to detection of failed fuel in spent fuel assemblies sotred in the spent fuel assembly storage pit.

SUMMARY OF THE INVENTION

The instant invention is an apparatus for testing fuel assemblies without removing them from the reactor core or from the spent fuel storage rack. A movable gas collection hood is provided that is adapted to engage the top of one fuel assembly so that gases exiting from the top of the assembly can be collected and monitored for radioactive fission products. Connected to the hood is the gas delivery means which is adapted to deliver an appropriate stripping gas to the bottom of the suspect fuel assembly. The gas delivery means may consist of a sleeve which is sized to fit through any of the control rod guide tubes which extend lengthwise from the top of the fuel assembly to the bottom of the fuel assembly. Alternatively, the gas delivery means may consist of a gas delivery tube with a connector adapted to connect to the uppermost portion of the control rod guide tube, thereby utilizing the control rod guide tube as the gas delivery passage for the delivery of the gas to the bottom of the suspect fuel assembly.

During operation of the testing apparatus, the stripping gas is delivered to the bottom of the fuel assembly. The gas then percolates up through the assembly thereby entraining some of the gaseous fission products contained in the coolant. The stripping gas and the entrained gas are then collected by the hood as they exit from the top of the fuel assembly. This gas is withdrawn to a detecting apparatus for measurement of the radioactivity of the gas. A measurement which indicates a higher activity than the average activity of the bulk coolant indicates the presence of one or more failed fuel elements in that fuel assembly.

BRIEF DESCRIPTION OF THE DRAWINGS

The present invention may be better understood and its numerous objects and advantages will become apparent to those skilled in the art by reference to the accompanying drawings wherein like reference numerals refer to like elements in the several figures and in which:

FIG. 1 is a diagram depicting a first preferred embodiment of the present invention.

FIG. 2 is a diagram depicting a second preferred embodiment of the present invention.

FIG. 3 is a diagram depicting the manner in which the first preferred embodiment of the present invention is utilized to detect the existence of failed fuel in a fuel assembly.

DESCRIPTION OF THE PREFERRED EMBODIMENT

A typical fuel element assembly which consists of clad longitudinally extending fuel rods 14 held in close array by spacer means 24 is illustrated in drawing 3. The fuel rods 14 are vertically positioned by the fuel assembly upper end fitting 20 through which flow holds 22 penetrate. The typical fuel assembly generally has longitudinal passages therethrough for the insertion and removal of neutron absorbing control rods. These passages are frequently defined by control rod guide tubes 18 as shown.

The spacing means 24 holds the fuel elements 14 in a fixed matrix with longitudinal channels 16 therebetween. In the ordinary operation of a nuclear reactor, coolant is forced from the bottom of the fuel assembly to the top of the fuel assembly through channels 16 thereby cooling the fuel elements 14. Another path that the coolant may take is through the control rod guide tubes 18. Accordingly, orifices 26 are provided in the bottom portion of the control rod guide tube 18 in order to allow the entry of the coolant into the tube.

Numeral 12 indicates generally an apparatus for the detection of fuel cladding failures in irradiated fuel bundles without their removal from the reactor core. This apparatus includes a gas collection means 28 and a gas delivery means 30. The gas collection means is typically a hood which is adapted to fit over the uppermost end of the fuel assembly. By this means any gas exiting from the top portion of the fuel assembly is collected by the hood 28. Gas delivery means 30 is typically a gas pipe connected to the hood 28 and is adapted to engage control rod guide tubes 18 or insert into them so that the gas may be delivered to the vicinity of the bottom of the fuel assembly. The gas so delivered by gas delivery means 30 is allowed to pass from the bottom of the control rod guide tube 18 into the fuel assembly 10 through the provided orifices 26.

In one embodiment illustrated in FIG. 1, the gas delivery means 30 is elongated into a sleeve 31 or a plurality of sleeves 31 which are adapted to fit into one or more of the control rod guide tubes 18. In this manner, gas may be pumped through tubes 30 into the elongated sleeve 31 and down to the bottom portion of the fuel assembly 10. In a second embodiment shown in FIG. 2, the gas delivery means 30 terminates at coupling 50 which is adapted to engage the uppermost portion of the control rod guide tube 18 in a leakproof connection. This coupling 50 is of the quick connector type with the ability of being remotely coupled and released. Such coupling members 50 are well known and have been thoroughly developed for quick coupling applications in the petroleum industry.

In the operation of the invention a stripping gas such as nitrogen is delivered through gas delivery means 30 by a connecting tube 36 from a nitrogen source 38. The gas is forced into the bottom of the suspect fuel assembly where it is allowed to escape into the coolant. From this lower position the gas percolates up through the coolant through the passages 16 and around the fuel elements 14 to the top of the fuel assembly 10. In its passagae through the fuel assembly, the gas comes into close contact with the fuel elements 14. During this journey, the gas entrains dissolved fission product gases and aids in the mechanism that causes the fission product gases to emit through any defect in a failed fuel element 14. When the gas which has percolated up through the suspect fuel assembly reaches the top of the fuel assembly, it exits therefrom and is collected by the hood 28. In the uppermost portion of the hood 28 is located a gas exit tube 32 which allows the stripping gas and the entrained fission gases to be pumped up through tube 34 by pump 40. Tube 34 and pump 40 deliver these gases and any coolant that is sucked up with the gases to a gas separation chamber 42 where the liquid and non-gaseous radioactive products are allowed to separate from the gases. These gases are then delivered to a second chamber 44 through tube 43. External to chamber 44 is a radiation detector 46 which is connected to a gamma ray counting device or gamma spectrometer 48. The detector 46 detects a portion of the radiation emitted by the fission gases contained in chamber 44 and delivers the detected signals to the gamma ray counter or spectrometer 48 which then performs a gamma pulse height analysis. In this manner, the gases emanating from a single fuel assembly are collected and analyzed for an indication of the existence of a failed fuel element in that fuel assembly. This procedure and apparatus have the advantage that the gases can be transported to an area of low background, thereby enabling a measurement of increased sensitivity. Also, the gases are separated from other radioactivity in the bulk coolant which will be present from operation of the reactor with failed fuel. These residual radioactive species, if present, would reduce signal sensitivity as in all prior art failed fuel detection devices which use water as transport media to transport the fission products to the detection system.

I claim:

1. A failed fuel detection apparatus for a nuclear reactor having a liquid cooled core composed of vertically disposed fuel assemblies, said fuel assemblies consisting of a spaced array of clad, vertically disposed, fuel elements with coolant channels therebetween and said fuel assemblies additionally having longitudinal passages therethrough for the insertion and removal of neutron absorption elements, said failed fuel detection means comprising:
    a. means adapted to engage the top of one of said fuel assemblies for collecting gas exiting from the top of said fuel assembly; and
    b. means mounted on said gas collection means for delivering gas to the vicinity of the bottom of said fuel assembly, said gas being capable of entraining gaseous fission products contained in said liquid coolant.

2. The apparatus as recited in claim 1, wherein said gas delivery means includes a longitudinal sleeve adapted to be inserted into one of said longitudinal passages of said fuel assembly.

3. The apparatus as recited in claim 1 wherein said longitudinal passages through said fuel assemblies are comprised of guide tubes for said neutron absorption elements and wherein said gas delivery means includes means adapted to engage at least one of said guide tubes thereby enabling said gas to be forced through said guide tubes to the vicinity of the bottom of said fuel assembly.

4. The apparatus as recited in claim 1 further including:

a. means for measuring the activity of said gaseous fission products collected by said gas collection means; and b. means connected to said gas collection means for conducting said collected gas containing said gaseous fission products to said activity measuring means.

* * * * *